United States Patent

Rastetter et al.

[11] Patent Number: 4,463,481
[45] Date of Patent: Aug. 7, 1984

[54] CLAMPING DEVICE

[75] Inventors: Adolf Rastetter; Erich Schmalenbach, both of Karlsruhe, Fed. Rep. of Germany

[73] Assignee: Sitema, Gesellschaft für Sicherheitstechnik and Maschinenbau mbH, Karlsruhe, Fed. Rep. of Germany

[21] Appl. No.: 374,861

[22] Filed: May 4, 1982

[30] Foreign Application Priority Data

May 9, 1981 [DE] Fed. Rep. of Germany ....... 3118449

[51] Int. Cl.³ .............................................. A44B 21/00
[52] U.S. Cl. ........................................ 188/67; 175/422
[58] Field of Search ....... 24/263 DA, 263 R, 263 SB, 24/263 SW, 263 DB, 249 DP, 243 R, 136 R

[56] References Cited

U.S. PATENT DOCUMENTS

| | | | |
|---|---|---|---|
| 1,844,378 | 2/1932 | Campbell | 24/249 DP |
| 2,109,546 | 3/1938 | McLagan | 24/263 DA |
| 2,491,711 | 12/1949 | Calhoun | 24/263 DA |
| 2,542,302 | 2/1951 | Barker | 24/263 DB |
| 3,096,075 | 7/1963 | Brown | 24/263 DA |
| 3,122,811 | 3/1964 | Gilreath | 24/263 DA |
| 3,416,284 | 12/1968 | Adler | 24/263 DA |
| 3,467,224 | 9/1969 | Curtis et al. | 24/263 DA |
| 3,748,702 | 7/1973 | Brown | 24/263 DA |

FOREIGN PATENT DOCUMENTS 2333491 1/1975 Fed. Rep. of Germany .

Primary Examiner—Victor N. Sakran
Attorney, Agent, or Firm—Wenderoth, Lind & Ponack

[57] ABSTRACT

A clamping device includes three clamping jaws guided at an angle in a housing for engaging an axially displaceable load-bearing rod. Reliable clamping is obtained without alteration of the setting position reached. This is achieved by providing a servo-piston in the housing, which piston is displaceable in both directions by servo-force and is directly connected to the clamping jaws. The frictional force between the rod and the bearing faces of the clamping jaws as well as between the guide faces of the clamping jaws and their associated guide tracks in the housing, as well as the angle of inclination of the guide tracks are such that, in operation, self-locking occurs. The clamping action of the clamping jaws may be released only by moving the servo piston.

12 Claims, 3 Drawing Figures

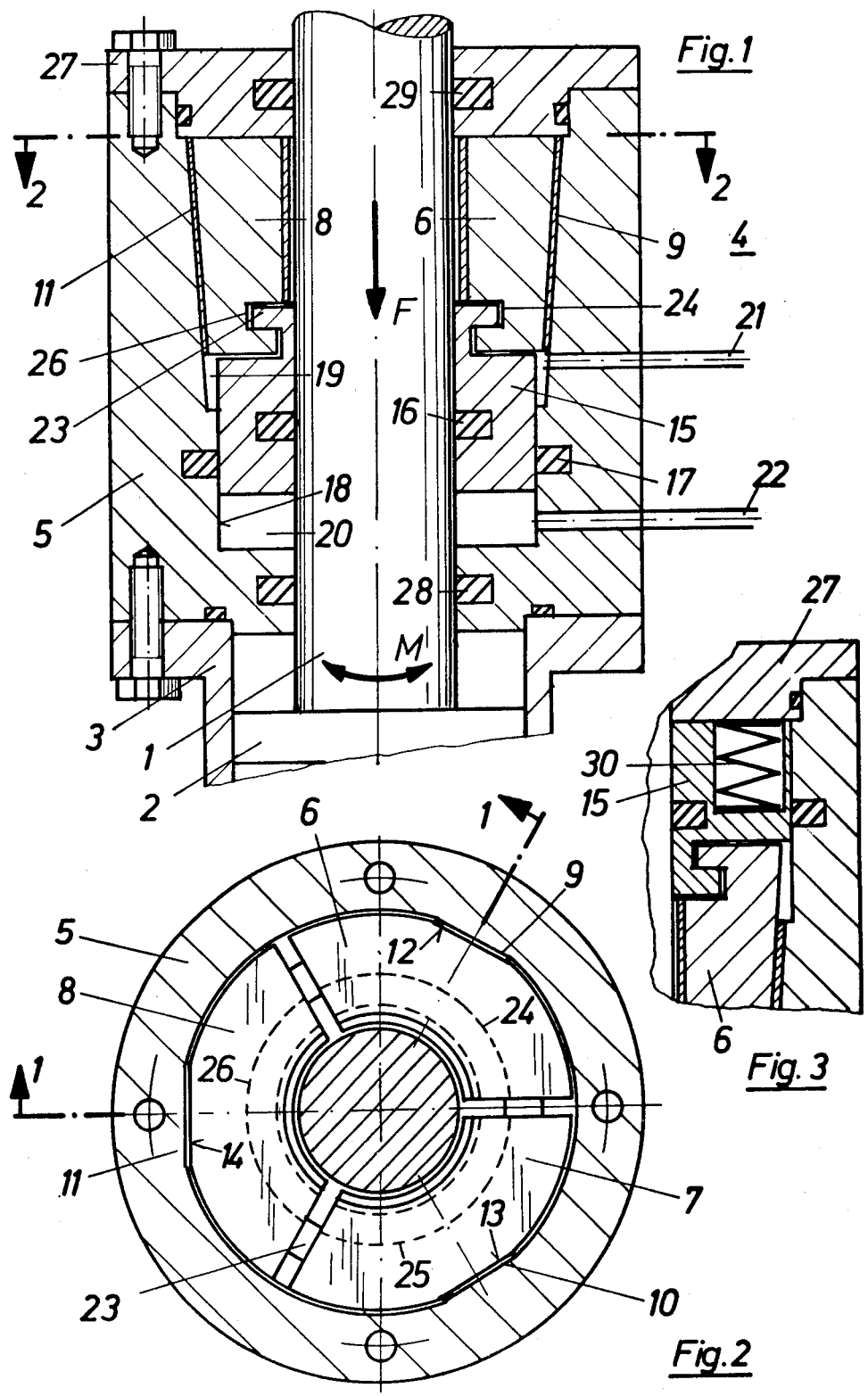

CLAMPING DEVICE

BACKGROUND OF THE INVENTION

The invention relates to a clamping device for an axially displaceable load-bearing rod, particularly for use in braking or immobilizing machine parts, preferably displaceable by a hydraulic drive, and of the type comprising one or preferably a plurality of clamping jaws which are displaceable in a housing on respective guide tracks inclined relative to the axis of the rod and which are connected to a servo-drive.

Clamping devices of the above-described type are used for immobilizing or braking machine parts or loads which are arranged to be movable by means of a rod, and particularly by way of a piston-rod. Such devices may be used as setting means for machine-tool parts and also as means for adjusting the level of components of various kinds which are moved from a travel position to fixed supports. A clamping device of this kind may also be used as a safety means for hydraulically lifted piston-rods in hoists, lifting platforms and the like, wherein a sudden unintentional drop in pressure of the hydraulic drive medium may cause a dangerous interruption of operations.

The prior art includes a clamping device wherein the clamping jaws are applied to the drive rod by relaxing a powerful spring. The clamping device is released when the spring force is hydraulically overcome by a pressure-applying piston. With such a clamping device, gripping and release of the drive rod is possible without additional movement of the rod, i.e. particularly without lowering a load. Furthermore the clamping device maintains its hold by spring force even in the event of power failure and drop in pressure. However, because of the relatively low spring force, imposed by design, only a relatively short distance of radial movement of the clamping jaws can be achieved. This calls for hard friction faces and involves the danger of the clamping jaws seizing on the drive rod. The relatively heavy springs increase the size of the construction, and failure of the springs immediately causes total removal of the clamping action.

DE-Ps 23 33 491, corresponding to U.S. Pat. No. 3,995,534, discloses a catch device, forming a safety means for hydraulically lifted piston-rods in lift cabins or on crane platforms, in which device the piston-rod is provided with a brake device, which is actuated by the pressure of the operating medium and is provided with a plurality of brake jaws which are under direct spring bias. The brake jaws, in the form of sectors of a circle, surround the piston-rod and are displaceably mounted in the housing on guide tracks which are inclined relative to the central axis. The brake jaws are moved by way of associated hydraulic drives which are controlled by the operating medium. In this catch device, the use of inclined guide tracks permits the brake jaws to execute great axial and radial movements, so that use can be made of soft brake linings in an arrangement that is not affected by differences in sizes due to manufacturing tolerances, so that no metallic surfaces that rub against each other are present. Because of the clamping forces set up when the load is lowered, a construction of small volume is achieved, and the catch device is self-locking, because of the action of the load, even if the supply of the servo-medium fails.

However, in the case of this known catch device, a suitable movement of the load is necessary both for using an cancelling the clamping action, and for certain purposes this movement cannot be carried out. If, for example, a machine part or apparatus part is first lifted into a specific position and if this position is to be secured by clamping, no additional movement of the load should take place for the purpose of effecting the clamping action.

SUMMARY OF THE INVENTION

The present invention seeks to provide a clamping device of the initially described kind in which a secure clamping action becomes possible without changing the position reached, which clamping action can be readily cancelled without movement of the load in the release direction.

According to the invention there is provided a clamping device for an axially displaceable load-bearing rod, such device comprising a plurality of clamping jaws surrounding the rod and displaceable in a housing on a respective planar guide track inclined relative to the axis of the rod, a servo-piston arranged in the housing directly operating said clamping jaws, first servo and-/or spring actuated means operable to move the servo-piston and hence the clamping jaws in a first axial direction in which the jaws are drawn along their respective inclined guide tracks towards the rod to clamp the same, the arrangement being such that the frictional force between the rod and the bearing faces of the clamping jaws as well as between the guide faces of the clamping jaws and their associated guide tracks and the angle of inclination of the guide tracks are such that, upon clamping of the clamping jaws against the rod, self-locking occurs, and second servo means operable to move the servo-piston and hence the clamping jaws in a second axial direction opposite to the first, whereby the clamping jaws are released.

Such an arrangement permits locking and release for the various drive rods by means of servo-force without a change in the setting position, the self-locking continuing for at least as long as the load is applied in one or the other direction. When the specific setting position of the load-carrying rod is reached, the clamping device can be locked by applying a hydraulic or pneumatic servo-medium or a spring force to one end of the servo-piston and by the clamping jaws, connected to the servo-piston, being advanced in the clamping direction into the self-locking position. If the servo-piston is then loaded in the release direction, the self-locking action between the clamping jaws and their guide tracks and on the load carrying rod can be cancelled, and the load carrying rod can then be freely moved.

In an advantageous arrangement, the servo-piston surrounds a round rod and engages in the clamping jaws in a holder, which has radial play which permits radial displacement of the clamping jaws on the guide tracks. The movement of the clamping jaws, which at sides thereof remote from the drive rod are guided in the housing on guide tracks inclined relatively to the central axis of the rod, results in a radial positioning movement which should not be impeded by the connection between the clamping jaws and the servo-piston. In a further advantageous arrangement, the servo-piston takes the form of an annular piston having a flange-like attachment which engages in complementary recesses formed in the clamping jaws.

In an advantageous construction, the servo-piston is sealed off from the piston rod extending through it as well as from its guide surface and it may also be guided on the load-carrying rod by means of non-metallic guide elements.

In a further advantageous arrangement, used in conjunction with a hydraulic lifting means, the rod may be formed as the piston rod associated with a drive cylinder supplied with a servo-medium. In this arrangement, it appears to be advantageous to design the clamping device as the head of this drive cylinder associated with the piston-rod, i.e. to arrange the sealing and guide elements, necessary for the driving cylinder, within the clamping device. This results in a compact component of small depth.

In yet another preferred arrangement, pressure compartments for introducing the servo-medium can be provided at both ends of the servo-piston, which compartments can be loaded to suit the required direction of movement of the servo-piston.

The servo-piston can be arranged at those sides of the clamping jaws having the smallest cross-sectional areas and, if expedient, at those sides having the largest cross-sectional areas. If the piston is arranged at the sides of the jaws having the greatest areas, a larger piston face results so that greater servo-forces can be achieved with a lower servo-pressure.

In the case of one-ended servo-action or as a safety measure in the event of failure of servo-pressure, the clamping jaws can be supported on compression springs which bear against the inner cover face of the housing. This effect can also be achieved if the servo-piston is arranged between the clamping jaws and the springs. A clamping device is thereby provided which permits locking in any given setting position without additional movement of the load and which, because of its robust and operationally safe construction, appears to be suitable for use under rough operating conditions. The required position can be set either directly by a simple displacement movement or rotary movement, or by a combined motional operation on the load-carrying rod.

BRIEF DESCRIPTION OF THE DRAWINGS

In order that the invention may be better understood, two embodiments thereof will now be described by way of example only and with reference to the accompanying drawings in which:

FIG. 1 is a longitudinal section, along line 1—1 of FIG. 2, through an embodiment of a clamping device according to the invention;

FIG. 2 is a transverse section along the line 2—2 of FIG. 1; and

FIG. 3 is an enlarged partial section illustrating a portion of an alternative construction comprising an arrangement of a servo-piston which differs from that shown in FIG. 1.

DETAILED DESCRIPTION OF THE INVENTION

FIGS. 1 and 2 illustrate a piston-rod 1 of circular cross-section which receives a load F in the direction indicated and possibly an additional moment of rotation M. The piston-rod 1 is connected to a piston 2 which is displaceably mounted in a hydraulic drive cylinder 3.

Mounted on hydraulic drive cylinder 3 to form the cylinder head is a clamping device 4 which has a housing 5.

In the housing 5, three clamping jaws 6, 7, 8 are arranged for radial and longitudinal displacement on guide tracks 9, 10, 11, which are inclined and form an angle of approximately 2° with the central axis of the piston-rod 1. In the illustrated embodiment, these guide tracks 9, 10, 11 take the form of slide faces associated with the housing 5. Advantageously, they could also have additional surface coverings or could take the form of ball, needle or roller bearings. Provided on the faces of the clamping jaws 6, 7, 8 that are presented to the housing are guide surfaces 12, 13, 14 that match the guide tracks 9, 10, 11.

An annular servo-piston 15 is displaceably mounted in the housing 5 and on the piston-rod 1. A resilient annular seal element 16 forms a seal between servo-piston 15 and piston-rod 1 extending therethrough. A similar annular sealing element 17 forms a seal between servo-piston 15 and the wall of a guide recess 18 formed in the housing 5.

Formed at each end of the servo-piston 15 in the housing 5 are pressure chambers 19, 20, to which can be supplied, by way of connecting pipes 21, 22 respectively, a hydraulic pressure medium so as to impart to the servo-piston 15 movement in the required direction.

The servo-piston 15 is provided with a flange-like attachment 23, which engages in complementary arcuate channels 24, 25, 26 formed in the respective clamping jaws 6, 7, 8 and which has the effect of uniting the jaws so that they are diplaced in unison. The depth of the arcuate channels 24, 25, 26 in relation to the outside diameter of the attachment 23 is so selected that the motional play occurring during the radial adjusting movement of the clamping jaws 6, 7, 8 can be taken up.

The housing 5 is closed off by a cover 27, against the inner face of which compression springs, not shown in FIG. 2, can be supported at one end, the other ends of these springs engaging in respective clamping jaws 6, 7, 8.

Seals are formed between piston-rod 1 and the interior of the housing 5 by means of sealing elements 28, 29.

If a pressure medium is supplied through the connection pipe 21, the upper pressure chamber 19, sealed off by the sealing elements 16, 17 and 29, becomes filled with pressure medium, and the servo-piston 15, by means of its flange-like attachment 23, pulls the clamping jaws 6, 7, 8 downwards. Because of the guiding action on the inclined guide tracks 9, 10, 11 on the housing 5 and due to the size of the angle of inclination and to the friction co-efficient, radial clamping becomes possible and this transmits the load F and any moment M that may be present to the supporting drive cylinder 3. This clamping action is fully maintained even when the servo-pressure ceases. To release the clamping action, pressure medium is introduced through the connecting pipe 22 into the lower pressure chamber 20, delimited by the sealing elements 28, 17 and 16. The servo-piston 15 moves upwards and releases the radial clamping action of the clamping jaws 6, 7, 8.

The partial illustration in FIG. 3 shows an arrangement wherein the servo-piston 15, likewise of annular shape, is arranged to be displaceable above the largest cross-sectional face of the clamping jaws 6, 7, 8 in a complementary recess formed in the housing. Fitted in complementary blind recesses in the servo-piston 15 are compression springs 30 which urge the piston and therefore the clamping jaws 6, 7, 8 into the clamping position, it being possible for the clamping device to be actuated exclusively by the application of pressure at one end of the servo-piston 15.

There has been described a clamping device having a compact structure which is little affected by rough operating conditions, which clamping device may be remote-controlled and combined with several similar devices.

The feature that the servo-piston directly operates the clamping jaws is intended to include an arrangement where there is direct engagement between servo-piston and clamping jaws as well as an arrangement where the servo-piston is adjacent to the clamping jaws.

We claim:

1. A device for clamping an axially displaceable load-bearing rod, said device comprising:
   a housing positioned with the rod extending therethrough, said housing having therein a plurality of planar guide tracks inclined relative to the axis of the rod;
   a plurality of clamping jaws spaced around the rod, each said clamping jaw being displaceable within said housing along a respective said guide track;
   a single annular servo-piston positioned within said housing surrrounding the rod and directly operating said clamping jaws;
   first means operable for moving said servo-piston and hence said clamping jaws in a first axial direction with respect to said housing such that said clamping jaws are drawn along their respective said inclined guide tracks toward the rod into clamping engagement therewith, the frictional force between the rod and the bearing faces of said clamping jaws, the frictional force between the guide faces of said clamping jaws and their said respective guide tracks and the angles of inclination of said guide tracks being such that, upon clamping of said clamping jaws against the rod, self-locking occurs; and
   servo second means, operable separately of said first means, for moving said servo-piston and hence said clamping jaws with respect to said housing in a second axial direction opposite to said first axial direction, and thereby to release said clamping jaws from the rod.

2. A device as claimed in claim 1, wherein said servo-piston comprises holding means for engaging in said clamping jaws with radial play and for permitting radial displacement of said clamping jaws as they move along their said respective guide tracks.

3. A device as claimed in claim 2, wherein said holding means comprises a flange-like attachment which engages in complementary recesses formed in said clamping jaws.

4. A device as claimed in claim 1, wherein said servo-piston is sealed by sealing elements with respect to the rod, and with respect to complementary guide faces of said servo-piston and said housing.

5. A device as claimed in claim 1, wherein said rod comprises the piston rod of a drive cylinder supplied with a servo-medium.

6. A device as claimed in claim 5, wherein said housing is attached as the head of said drive cylinder.

7. A device as claimed in claim 1, wherein said first means and servo second means comprise respective pressure chambers defined at respective ends of said servo-piston for the introduction of a servo-medium.

8. A device as claimed in claim 1, wherein said clamping jaws are backed directly or indirectly by respective compression springs against said housing.

9. A device as claimed in claim 8, wherein said compression springs are backed at one end by said servo-piston.

10. A device as claimed in claim 1, wherein said servo-piston is positioned at that side of each said clamping jaw having the largest cross-sectional area.

11. A device as claimed in claim 10, wherein said compression springs are backed at one end by said servo-piston.

12. A device as claimed in claim 1, wherein said clamping jaws and said guide tracks are arranged symmetrically in relation to the central axis of the rod.

* * * * *